United States Patent
Fan et al.

(10) Patent No.: US 11,438,645 B2
(45) Date of Patent: Sep. 6, 2022

(54) MEDIA INFORMATION PROCESSING METHOD, RELATED DEVICE, AND COMPUTER STORAGE MEDIUM

(71) Applicant: Huawei Technologies Co., Ltd., Shenzhen (CN)

(72) Inventors: Yuqun Fan, Shenzhen (CN); Peiyun Di, Shenzhen (CN); Fuzheng Yang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 17/038,744

(22) Filed: Sep. 30, 2020

(65) Prior Publication Data

US 2021/0014558 A1    Jan. 14, 2021

Related U.S. Application Data

(63) Continuation of application No. PCT/CN2019/081024, filed on Apr. 2, 2019.

(30) Foreign Application Priority Data

Apr. 4, 2018    (CN) .......................... 201810309177.8

(51) Int. Cl.
*H04N 21/438*    (2011.01)
*H04N 21/4402*    (2011.01)
(Continued)

(52) U.S. Cl.
CPC ....... *H04N 21/438* (2013.01); *H04N 21/4402* (2013.01); *H04N 21/6587* (2013.01); *H04N 21/84* (2013.01); *H04N 21/8456* (2013.01)

(58) Field of Classification Search
CPC ............. H04N 21/438; H04N 21/4402; H04N 21/6587; H04N 21/84; H04N 21/8456;
(Continued)

(56) References Cited

U.S. PATENT DOCUMENTS

2010/0118938 A1    5/2010  Fuchs et al.
2011/0231569 A1*   9/2011  Luby ....................... G06F 15/16
(Continued)

FOREIGN PATENT DOCUMENTS

CN    102217272 A    10/2011
CN    103957471 A     7/2014
(Continued)

OTHER PUBLICATIONS

ISO/IEC14496-12 Dec. 15, 2015 Information technology—Coding of audio visual objects part 12 ISO base media file format (Year: 2015).*

*Primary Examiner* — Anthony Bantamoi
(74) *Attorney, Agent, or Firm* — Conley Rose, P.C.

(57) ABSTRACT

A media information processing method includes obtaining media description information, where the media description information includes description information of at least two bitstreams corresponding to a first picture area, any one of the at least two bitstreams has an access point different in time from an access point of another bitstream in the at least two bitstreams, the at least two bitstreams are bitstreams obtained by separately encoding picture content of the first picture subarea, and time periods corresponding to the picture content separately encoded by the at least two bitstreams overlap, and determining, based on the media description information, a to-be-played first target bitstream, where the first target bitstream is one of the at least two bitstreams.

24 Claims, 3 Drawing Sheets

(51) Int. Cl.
*H04N 21/6587* (2011.01)
*H04N 21/84* (2011.01)
*H04N 21/845* (2011.01)

(58) Field of Classification Search
CPC ......... H04N 21/23439; H04N 21/4856; H04N 21/4728; H04N 19/176; H04N 21/23424; H04N 21/2393; H04N 21/26275; H04N 21/816; H04N 21/8455; H04N 21/440281
See application file for complete search history.

(56) References Cited

U.S. PATENT DOCUMENTS

| | | | |
|---|---|---|---|
| 2013/0293787 A1 | 11/2013 | Van Wallendael et al. | |
| 2014/0189772 A1* | 7/2014 | Yamagishi | H04N 21/2353 |
| 2016/0127728 A1* | 5/2016 | Tanizawa | H04N 19/114 |
| 2017/0078354 A1 | 3/2017 | Yang et al. | |
| 2018/0213300 A1* | 7/2018 | Chen | H04N 21/8455 |
| 2019/0174177 A1 | 6/2019 | Li et al. | |

FOREIGN PATENT DOCUMENTS

| | | |
|---|---|---|
| CN | 104270646 A | 1/2015 |
| CN | 106303682 A | 1/2017 |
| WO | 2018005835 A1 | 1/2018 |

\* cited by examiner

Tile: square coding area

MEDIA INFORMATION PROCESSING METHOD, RELATED DEVICE, AND COMPUTER STORAGE MEDIUM

CROSS-REFERENCE TO RELATED APPLICATIONS

This application is a continuation of International Patent Application No. PCT/CN2019/081024 filed on Apr. 2, 2019, which claims priority to Chinese Patent Application No. 201810309177.8 filed on Apr. 4, 2018. The disclosures of the aforementioned applications are hereby incorporated by reference in their entireties.

TECHNICAL FIELD

The present disclosure relates to the field of multimedia technologies, and in particular, to a media information processing method, a related device, and a computer storage medium.

BACKGROUND

With wide application and popularization of a large viewport video, more people have a chance to experience the large viewport video. A viewport range covered by the large viewport video is excessively large, and exceeds a normal line of sight range of people. Therefore, in a process of viewing the large viewport video, a user may adjust a viewing angle, to view video pictures in different fields of view. Therefore, in a process in which the viewport changes, bitstreams (video streams) are switched.

In an existing bitstream switching solution, a server prepares one bitstream for each viewport at different bit rates, and bitstream access points (stream access point (SAP), access point) included in these bitstreams overlap in time. When the viewing angle of the user changes, a client may adaptively select a target bitstream of a corresponding bit rate based on a network status for downloading, decoding, and playing. In bitstream encoding and decoding processes, to implement normal decoding and playing of the target bitstream, decoding needs to start from an access point, to play a bitstream after the access point. It can be learned that there is a relatively long switching delay from change in the viewport to access of the bitstream access point. This reduces bitstream switching efficiency.

SUMMARY

Embodiments of the present disclosure disclose a media information processing method, a related device, and a computer storage medium, to resolve problems such as a relatively long switching delay and relatively low bitstream switching efficiency in an existing video switching method.

According to a first aspect, an embodiment of the present disclosure discloses a media information processing method. The method includes obtaining media description information, where the media description information includes description information of at least two bitstreams corresponding to a first picture area, any one of the at least two bitstreams has an access point different in time from an access point of another bitstream in the at least two bitstreams, the at least two bitstreams are bitstreams obtained by separately encoding picture content of the first picture area, and time periods corresponding to the picture content separately encoded by the at least two bitstreams overlap, and determining, based on the media description information, a to-be-played first target bitstream, where the first target bitstream is one of the at least two bitstreams corresponding to the first picture subarea. The determining a to-be-played first target bitstream may include determining the first target bitstream from the at least two bitstreams corresponding to the first picture subarea.

In some possible embodiments, the at least two bitstreams include a first bitstream and a second bitstream, and an access point SAP that does not overlap with an access point SAP in the second bitstream in time exists in the first bitstream. The at least two bitstreams include the first bitstream and the second bitstream, and a time point corresponding to an $N^{th}$ SAP of the first bitstream is located between a time point corresponding to an $N^{th}$ SAP of the second bitstream and an $(N+1)^{th}$ time point of the second bitstream, where the time point corresponding to the $N^{th}$ SAP of the first bitstream is different from the time point corresponding to the $N^{th}$ SAP of the second bitstream, the time point corresponding to the $N^{th}$ SAP of the first bitstream is different from the time point corresponding to the $(N+1)^{th}$ SAP of the second bitstream, and N is a group of integers greater than 1 or an integer greater than 1. For example, when the first bitstream includes K access points, N may be a group of integers from 3 to K.

In some embodiments, the at least two bitstreams include the first bitstream and the second bitstream, a start time point corresponding to the first bitstream is the same as a start time point corresponding to the second bitstream, and a length of a first bitstream segment in the first bitstream is different from a length of a first bitstream segment in the second bitstream.

In some embodiments, a length of an $N^{th}$ bitstream segment in the first bitstream is the same as a length of an $M^{th}$ bitstream segment in the second bitstream, where M is a group of integers greater than 1 or an integer greater than 1.

In some embodiments, a time point corresponding to an SAP in an $M^{th}$ bitstream segment in the first bitstream is different from a time point corresponding to an SAP in the $M^{th}$ bitstream segment in the second bitstream.

In some embodiments, the at least two bitstreams have a same quality parameter, and the quality parameter is used to indicate quality of the bitstream. The quality parameter includes at least one of resolution, a frame rate, a bandwidth, a quality level, a bit rate, definition, brightness, and the like.

In some embodiments, the first target bitstream is a bitstream that corresponds to a first target access point and that is in the at least two bitstreams, and a time point corresponding to the first target access point meets any one of the following: (1) the first target SAP is an access point that is in access points included in the at least two bitstreams and that corresponds to a time point closest to a time point of to-be-played content, and the time point corresponding to the first target access point is after the time point of the to-be-played content, and (2) the first target SAP is an SAP that is in SAPs included in the at least two bitstreams and that corresponds to a time point closest to a target time point, where the time point corresponding to the first target SAP is after the target time point, and the target time point is a sum of the time point of the to-be-played content and duration required for downloading a bitstream segment in which the first target SAP is located, or the target time point is a sum of the time point of the to-be-played content and preset duration.

In some embodiments, the method further includes playing the to-be-played first target bitstream.

In some embodiments, this application may be applied to a scenario in which a user adjusts a bitstream playing progress. Before determining a to-be-played first target bitstream, the method further includes playing picture data corresponding to any one of the at least two bitstreams, and determining, based on the media description information, the to-be-played first target bitstream only when a time point of content currently needs to be played is switched to the time point of the to-be-played content.

In some embodiments, the media description information further includes description information of at least two bitstreams corresponding to a second picture area, and determining, based on the media description information, a to-be-played first target bitstream includes determining the first target bitstream and a to-be-played second target bitstream based on the media description information, where the second target bitstream is one of the at least two bitstreams corresponding to the second picture area.

In some embodiments, the first target bitstream and the second target bitstream meet at least one of the following conditions: (1) quality parameters respectively corresponding to the first target bitstream and the second target bitstream are the same, (2) a time point corresponding to each of access points included in the first target bitstream is the same as a time point corresponding to each of access points included in the second target bitstream, and (3) a bitstream segment in which the first target access point is located is completely downloaded within first duration, and a bitstream segment in which the second target access point is located is completely downloaded within second duration, where the first duration is duration between the time point corresponding to the first target access point and the time point of the to-be-played content, the first target access point is an access point that is in the access points included in the first target bitstream and that corresponds to the time point closest to the time point of the to-be-played content, and the time point corresponding to the first target access point is after the time point of the to-be-played content, and the second duration is duration between a time point corresponding to the second target access point and the time point of the to-be-played content, the second target access point is an access point that is in access points included in the second target bitstream and that corresponds to the time point closest to the time point of the to-be-played content, and the time point corresponding to the second target access point is after the time point of the to-be-played content.

In some embodiments, the at least two bitstreams corresponding to the first picture area or the at least two bitstreams corresponding to the second picture area include a third bitstream and a fourth bitstream, where a time point corresponding to an $(N+1)^{th}$ access point included in the third bitstream is after a time point corresponding to an $N^{th}$ access point included in the fourth bitstream, and is before a time point corresponding to an $(N+1)^{th}$ access point included in the fourth bitstream, and the third bitstream is the first target bitstream or the second target bitstream.

In some embodiments, this application is applicable to a scenario in which a viewport of the user changes. Before determining a to-be-played first target bitstream, the method further includes playing picture data corresponding to a bitstream corresponding to a third picture area, and determining, based on the media description information, the to-be-played first target bitstream only when the picture data corresponding to the third picture area that is played needs to be switched to a picture data corresponding to the first picture area.

In some embodiments, this application is applicable to a scenario in which network quality is unstable. Before determining a to-be-played first target bitstream, the method further includes playing picture data corresponding to a current bitstream corresponding to the first picture area, and determining, based on the media description information, the to-be-played first target bitstream only when the picture data corresponding to the current bitstream that is played needs to be switched to picture data that corresponds to a bitstream with a target quality parameter and that corresponds to the first picture area, where the at least two bitstreams each have the target quality parameter, and a quality parameter of the current bitstream is different from the target quality parameter.

In some embodiments, the media description information is a media presentation description (MPD) file.

In some embodiments, the MPD file includes first indication information, and the first indication information is used to indicate information about the time point corresponding to the access point included in the first target bitstream.

In some embodiments, the information about the time point includes a time point corresponding to a first access point in the first target bitstream, a time interval between two adjacent access points in the first target bitstream, and a quantity of access points in the first target bitstream.

In some embodiments, the MPD file includes first description information of the first target bitstream, and the first description information includes the first indication information.

In some embodiments, the MPD file further includes second description information of the second target bitstream, the second description information includes second indication information, and the second indication information is used to indicate that the time point corresponding to the access point included in the first target bitstream is the same as the time point corresponding to the access point included in the second target bitstream.

In some embodiments, the MPD file includes the first description information of the first target bitstream, and the first description information includes the first indication information, and the MPD file further includes the second description information of the second target bitstream, the second description information includes the second indication information, and the second indication information is used to indicate that time periods corresponding to bitstream segments respectively included in the first target bitstream and the second target bitstream overlap.

In some embodiments, the media description information includes information in a media track in which the first target bitstream is located.

In some embodiments, the media description information includes fourth indication information, the media track in which the first target bitstream is located includes first box data, the first box data includes the fourth indication information, and the fourth indication information is used to indicate information about the time point corresponding to the access point included in the first target bitstream.

In some embodiments, the information about the time includes a time point corresponding to a first access point in the first target bitstream, a time interval between two adjacent access points in the first target bitstream, and a quantity of access points in the first target bitstream.

In some embodiments, the first box data further includes fifth indication information, and the fifth indication information is further used to indicate a quantity of access point groups, and the information about the time includes a time point corresponding to a first SAP in the first target bitstream, a time interval between two adjacent access points in the first bitstream, and a quantity of access points in the first bitstream.

In some embodiments, when there are at least two access point groups, the access point groups may include a first access point group and a second access point group that are adjacent in time. Time intervals between two adjacent access points in the first access point group are the same, time intervals between two adjacent access points in the second access point group are the same, and there is no access point between a last access point in the first access point group and a first access point in the second access point group. A time point corresponding to the last access point in the first access point group is before a time point corresponding to the first access point in the second access point group.

In some embodiments, the media description information includes sixth indication information in a media track in which the second target bitstream is located, the media track in which the second target bitstream is located includes second box data, and the second box data includes the sixth indication information, where the sixth indication information is used to indicate that the time point corresponding to the access point included in the first target bitstream is the same as the time point corresponding to the access point included in the second target bitstream.

In some embodiments, the media track in which the first target bitstream is located further includes third box data, the third box data includes seventh indication information, and a value of the seventh indication information is the same as a value of the sixth indication information.

In some embodiments, the second box data and the third box data are box data of a combination type (TrackGroupTypeBox), and a combination type of the second box data is the same as a combination type of the third box data.

According to a second aspect, an embodiment of the present disclosure provides a terminal device. The terminal device includes a communications unit and a processing unit, where the communications unit is configured to obtain media description information, where the media description information includes description information of at least two bitstreams corresponding to a first picture area, the at least two bitstreams include a first bitstream and a second bitstream, an access point SAP that does not overlap with an access point SAP in the second bitstream in time exists in the first bitstream, the at least two bitstreams are bitstreams obtained by separately encoding picture content of the first picture subarea, and time periods corresponding to the picture content encoded by the at least two bitstreams overlap, and the processing unit is configured to determine, based on the media description information, a to-be-played first target bitstream, where the first target bitstream is one of the at least two bitstreams corresponding to the first picture area.

In some embodiments, the terminal device further includes a playing unit, where the playing unit is configured to play picture data corresponding to the bitstream.

For a part that is not shown or not described in this embodiment of the present disclosure, refer to the related description in the method embodiment described in the first aspect. Details are not described herein.

According to a third aspect, an embodiment of the present disclosure provides another terminal device. The terminal device includes a memory and a processor coupled to the memory, where the memory is configured to store an instruction, the processor is configured to execute the instruction, and when executing the instruction, the processor performs the method according to the first aspect.

In some embodiments, the terminal device further includes a display coupled to the processor, and the display is configured to play, under control of the processor, picture data corresponding to a first target bitstream.

In some embodiments, the terminal device further includes a communications interface. The communications interface communicates with the processor, and the communications interface is configured to communicate with another device (for example, a network device) under the control of the processor.

In some embodiments, the terminal device further includes a receiver coupled to the processor, and the receiver is configured to obtain media description information under the control of the processor. The receiver may receive media description information sent by a server.

According to a fourth aspect, a computer-readable storage medium is provided. The computer-readable storage medium stores program code used for service switching processing. The program code includes an instruction used to perform the method according to the first aspect.

According to the embodiments of the present disclosure, the problems such as the relatively long switching delay in the existing video switching method can be resolved. This improves bitstream switching efficiency.

BRIEF DESCRIPTION OF DRAWINGS

To describe technical solutions in some embodiments of the present disclosure more clearly, the following briefly describes accompanying drawings for describing some of the embodiments.

DESCRIPTION OF EMBODIMENTS

Figure 1:
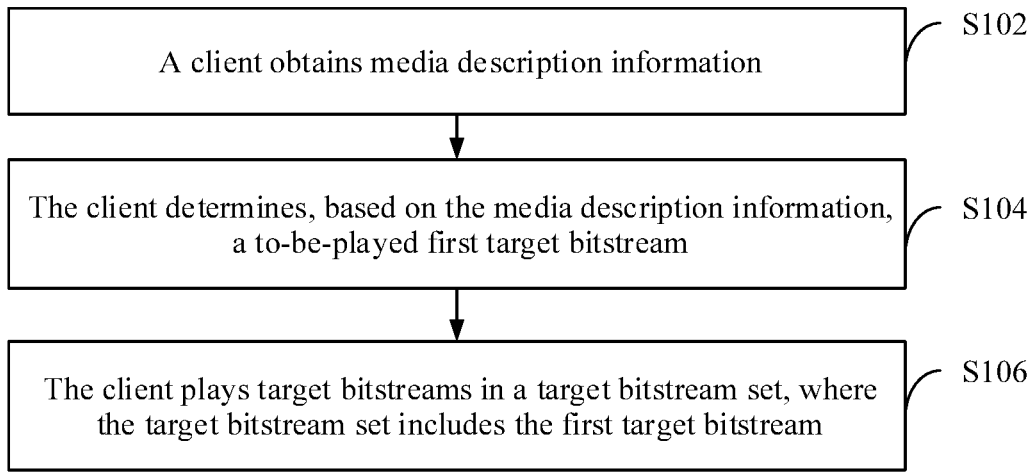
FIG. 1 is a schematic flowchart of a media information processing method according to an embodiment of the present disclosure.

The following describes technical solutions in embodiments of the present disclosure in details with reference to accompanying drawings in the present disclosure.

First, some knowledge concepts in this application are described.

A panoramic video is also referred to as a 360-degree panoramic video or a 360-degree video, and is a video shot using a plurality of cameras in omnidirectional 360 degrees. When viewing the video, a user may randomly adjust a viewport of the user.

A tile is a square coding area, in the video coding standard High Efficiency Video Coding (HEVC), obtained by dividing a to-be-encoded picture. A picture may be divided into a plurality of tiles, and the tiles jointly form the picture. Each tile can be independently encoded. Correspondingly, in a complete media stream (bitstream), the complete media stream may include media streams corresponding to a plurality of tiles. Sub-pictures respectively corresponding to the plurality of tiles at a same moment (timestamp) may form a complete picture.

Sub-picture: A picture is split to obtain a part of the original picture, and the part of the original picture is referred to as a sub-picture of the picture. In some embodiments, the sub-picture is square, and the sub-picture may be a part of a picture.

Picture area: For ease of description of this patent, the picture area is used as a collective term of the tile or the sub-picture. It may be understood that the sub-picture in the present disclosure may alternatively include a picture divided in a tile coding manner. A size of the picture area in the present disclosure is not limited. The picture area may be an area of a sub-picture including one or more tiles, or may be an area corresponding to a complete picture.

SAP: A full name of the SAP is media stream access point (also referred to as bitstream access point). The media stream access point is a position point in a media stream (bitstream), and bitstream data at the position point and after the position point can be normally played. In the standard the International Organization for Standardization (ISO)/the International Electrotechnical Commission (IEC) 14496-12, the SAP is defined as "A SAP is a position in a container enabling playback of an identified media stream to be started using only (a) the information contained in the container starting from that position onwards, and (b) possible initialization data from other part(s) of the container, or externally available". This is translated as follows: "An access point is a position in a container, and a media stream can be normally played using information after the position point in the container and initialization data that may be required at another position in the container or external initialization data that may be required".

RAP: A full name of the RAP is random access point (media stream random access point), is a type of access point in access points, and is an access point whose type is 1, 2, and 3. In the standard ISO/IEC 14496-12, the media stream random access point is defined as "sample in a track that starts at the ISAU of an SAP of type 1 or 2 or 3 as defined in Annex I; informally, a sample, from which when decoding starts, the sample itself and all samples following in composition order can be correctly decoded". This is translated as follows: "The RAP is a frame in a track that starts at an ISAU frame of an SAP of types 1 and 2, a type of the SAP is defined in Annex I, and formal representation is that a RAP frame indicates that all frames starting from this frame and a subsequent frame can be correctly decoded in a decoding sequence".

Access point: For ease of description in this patent, the access point is used as a collective term of the SAP or the RAP, or another position point used to support access of a bitstream and successful decoding and playing. This is not limited in this application.

GOP: A full name of the GOP is a group of pictures, and the GOP refers to a group of pictures. Generally, the GOP includes an I frame, a P frame, and a B frame. A bitstream usually includes a plurality of consecutive GOPs. When a decoder encounters a new GOP, the decoder can correctly decode all picture data in the GOP without any frame before the GOP.

A track is translated as "track" in Chinese and is defined in the standard ISO/IEC 14496-12 as "timed sequence of related samples (q.v.) in an ISO base media file. Note: For media data, a track corresponds to a sequence of images or sampled audio, for hint tracks, a track corresponds to a streaming channel." This is translated as follows: "timed sequence of related samples in an ISO media file. Note: For media data, a track corresponds to a sequence of images or sampled audio, for hint tracks, a track corresponds to a streaming channel." Explanation: The track is a series of timed samples that are encapsulated in an ISO base media file format (ISOBMFF) manner. For example, in a video track, a video sample is obtained by encapsulating, according to a specification of the ISOBMFF, a bitstream that is generated after a video encoder encodes each frame.

A box is translated as "box" in Chinese and is defined in the ISO/IEC 14496-12 standard as an "object-oriented building block defined by a unique type identifier and length. Note: Called 'atom' in some specifications, including the first definition of MP4." This is translated as follows: "object-oriented building block defined by a unique type identifier and length. Note: Called 'atom' in some specifications, including the first definition of MP4." The box is a basic unit that constitutes an ISOBMFF file, and the box may include another box.

An MPD is a file specified in the ISO/IEC 23009-1 standard. The file includes metadata that is used by a client to construct a HyperText Transfer Protocol (HTTP)-uniform resource locator (URL). The MPD includes one or more period elements. Each period element includes one or more adaptation sets. Each adaptation set includes one or more representations. Each representation includes one or more segments. The client selects a representation based on information in the MPD, and constructs an HTTP-URL of a segment.

The ISO/IEC 23009-1 standard specification is also referred to as Dynamic Adaptive Streaming over HTTP (DASH). The standard specification defines a media description format such that a media player can request a media stream file in a network adaptive manner using media information described in a media description file.

The ISO/IEC 23090-2 standard specification is also referred to as an Omnidirectional Media Format (OMAF) standard specification. The specification defines a media application format that can implement presentation of omnidirectional media in an application. The omnidirectional media mainly refers to an omnidirectional video (360° video) and associated audio. The OMAF specification first specifies a list of projection methods that can be used to convert a spherical video into a two-dimensional video, and specifies how to use an ISOBMFF to store the omnidirectional media and metadata associated with the media, and how to encapsulate and transmit data of the omnidirectional media in a streaming media system, for example, using DASH or dynamic adaptive streaming specified in the ISO/IEC 23009-1 standard.

The ISOBMFF includes a series of boxes. One box may further include another box. The boxes include a metadata box and a media data box. The metadata box (moov box) includes metadata, and the media data box (mdat box) includes media data. The metadata box and the media data box may be in a same file, or may be in separate files. If timed metadata is encapsulated using the ISO base media file format, the metadata box includes metadata that describes timed metadata, and the media data box includes timed metadata.

Next, a media information processing method in this application is described. The method is applied to a scenario in which a bitstream is switched. FIG. 1 shows a media information processing method, and the method includes the following implementation steps.

Step S102: A client obtains media description information, where the media description information includes description information of at least two bitstreams corresponding to first picture content, and any one of the at least two bitstreams has an access point different in time from an access point of another bitstream in the at least two bitstreams.

In this application, the at least two bitstreams are bitstreams obtained by separately encoding picture content of the first picture subarea, and time periods of the picture content corresponding to the at least two bitstreams overlap.

In this application, a size of the picture area is not limited. The picture area may be an area of a sub-picture including one or more tiles, or may be an area corresponding to a complete picture. In this application, the following describes related content using an example in which the picture area is a tile.

Step S104: The client determines, based on the media description information, a to-be-played first target bitstream, where the first target bitstream is one of the at least two bitstreams.

Step S106: The client plays target bitstreams in a target bitstream set, where the target bitstream set includes the first target bitstream.

The following describes some specific embodiments and optional embodiments in this application.

In this application, the media description information may include description information of a plurality of bitstreams corresponding to each of m picture areas. To be specific, the media description information includes a plurality of bitstreams corresponding to each of m tiles, where m is a positive integer. A bit rate corresponding to each of the plurality of bitstreams in each tile may be customized by a user side or a system side. To be specific, bit rates respectively corresponding to any two bitstreams in each tile may be the same or may be different. However, a plurality of bitstreams corresponding to a same tile have same encoding performance. That the plurality of bitstreams have the same encoding is described below.

Optionally, the plurality of bitstreams corresponding to the picture area, that is, the tile, may have a same quality parameter. The quality parameter includes but is not limited to resolution, a frame rate, a bandwidth, a quality level, definition, a bit rate, brightness, and the like. Details are not described herein.

Optionally, at least two bitstreams that have a same quality parameter may be correspondingly configured in each tile. The at least two bitstreams are bitstreams obtained by separately encoding picture content of the same tile, and time periods of the picture content corresponding to the at least two bitstreams overlap. To be specific, the at least two bitstreams that have the same quality parameter in the same tile include to-be-played picture content in a same time period. In this application, the following describes related content using the quality parameter as the bit rate. For example, a bitstream A and a bitstream B corresponding to a same bit rate exist in a tile 1, and the bitstream A and the bitstream B each include picture content in a time period corresponding to a $10^{th}$ minute to a $20^{th}$ minute in a played video C.

The m tiles include at least the first picture area (that is, a first tile). To be specific, the media description information includes at least two bitstreams corresponding to the first tile, and bit rates of the at least two bitstreams may be the same or may be different.

It may be understood that bitstreams corresponding to the m tiles may form one complete large viewport bitstream. Correspondingly, sub-pictures respectively corresponding to the m tiles at a same moment (timestamp) may be spliced to form one complete large viewport picture.

In some embodiments, the media description information further includes description information of an access point included in each bitstream. To be specific, the media description information further includes the access point included in each bitstream. A quantity of access points and a time point (position) corresponding to the access point in the bitstream are not limited, and may be customized by the system side.

It may be understood that each bitstream may include at least one bitstream segment. The segment includes one or more GOPs, and a GOP length of each segment is not limited. GOP lengths of the segments may be the same or may be different. Correspondingly, the access point may be a start time point or an end time point of the GOP included in the segment. To be specific, the access point may be the start time point, an intermediate time point, the end time point, and the like of the bitstream segment in the bitstream. A method for representing the time point corresponding to the access point in the bitstream is described in detail below.

In some embodiments, to ensure that switching between bitstreams in a same tile is more quickly or does not conflict, access points respectively included in any two bitstreams in the same tile do not overlap in time, or any two bitstreams in the same tile have access points that do not overlap in time. Bit rates of the any two bitstreams may be the same or may be different.

When the bit rates of the any two bitstreams are the same, access points respectively included in at least two bitstreams that have the same bit rate in the same tile do not overlap in time, or at least two bitstreams that have the same bit rate in the same tile have access points that do not overlap in time. The first tile is used as an example. If the at least two bitstreams corresponding to the first tile include a first bitstream and a second bitstream, the first bitstream has an access point that does not overlap an access point in the second bitstream in time.

Using an example in which the at least two bitstreams include the first bitstream and the second bitstream, it indicates that the first bitstream has the access point that does not overlap with the access point in the second bitstream in time.

Figure 2:
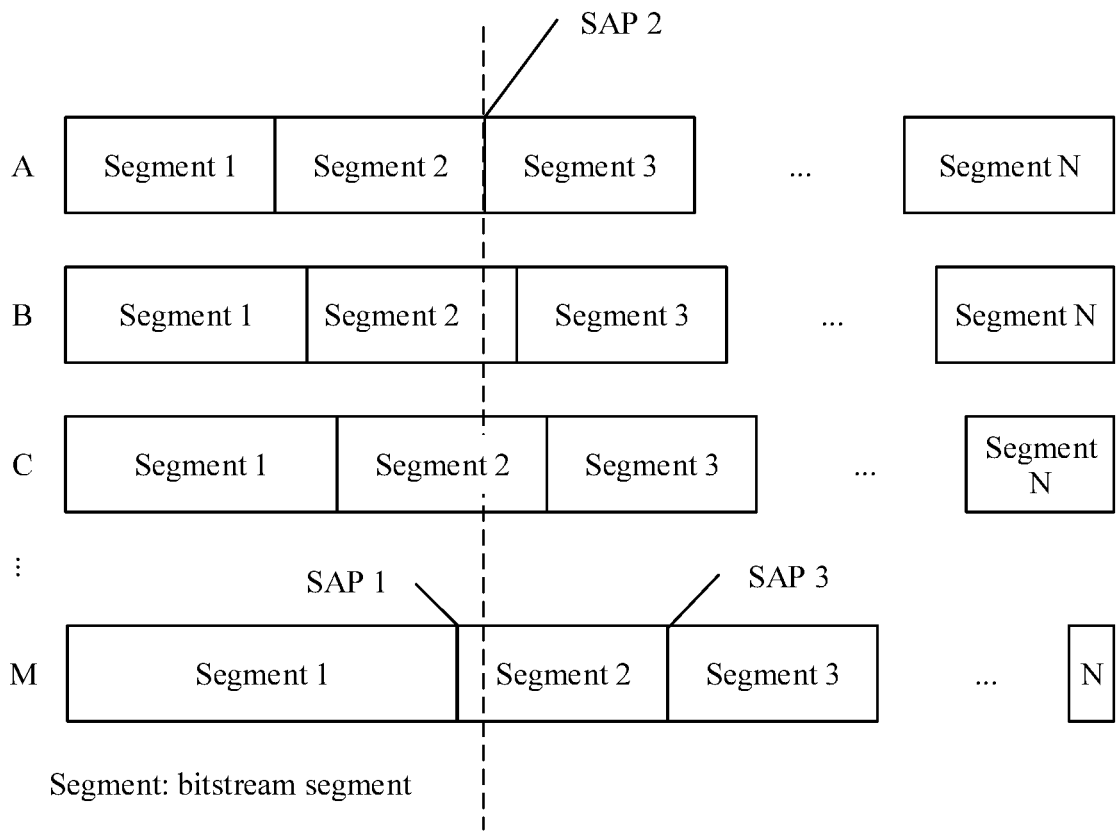
FIG. 2 is a schematic diagram of different bitstreams in a same tile according to an embodiment of the present disclosure.

FIG. 2 is a schematic diagram of access points in M bitstreams in one tile. Duration, a bit rate, and a quantity of segments included in each of the M bitstreams are not limited. In the figure, an example in which each bitstream includes only N segments is used. As shown in FIG. 2, a time point corresponding to the access point in each of the M bitstreams is a start time point or an end time point of the segment in each bitstream. To be specific, a position of the access point in each bitstream is a start/end position of each segment in the bitstream. As shown in the figure, an end time point of a previous segment in a same bitstream is a start time point of a next segment, and both the end time point and start time point indicate time points corresponding to a same access point.

As shown in FIG. 2, in the M bitstreams, except that start time points of segments 1 and end time points of segments N are the same or aligned, start time points and end time points of other segments are staggered and do not overlap. To be specific, the access points respectively included in the M bitstreams do not overlap in time.

Optionally, for ease of design, duration of first segments (the segment 1) in two adjacent bitstreams may be set to be different, and subsequent segments are encapsulated according to a normal GOP length. As shown in FIG. 2, in the M bitstreams, duration of a segment 1 of a next bitstream is longer than duration of a segment 1 of a previous bitstream by a specific duration interval, and the duration interval is customized by a user side or a system side, for example, 200 milliseconds (ms). Duration of other segments (segments 2 to segments N−1) remains the same. This is not limited in this application.

In some embodiments, in any two bitstreams in a same tile, for example, a third bitstream and a fourth bitstream, a time point corresponding to an $(N+1)^{th}$ access point included in the third bitstream is after a time point corresponding to an $N^{th}$ access point included in the fourth bitstream, and is before a time point corresponding to an $(N+1)^{th}$ access point included in the fourth bitstream. As shown in FIG. 2, an end time point of a segment 2 in a bitstream A is used as an access point 2 (shown as an SAP 2 in the figure), and a start position and an end point position of a segment 2 in each of a bitstream B to a bitstream M are respectively an access point 1 (shown as an SAP 1 in the figure) and an access point 3 (shown as an SAP 3 in the figure). It can be seen from the figure that a time point corresponding to the access point 1 of each of the bitstream B to the bitstream M is before a time point corresponding to the access point 2 in the bitstream A, and a time point corresponding to the access point 3 of each of the bitstream B to the bitstream M is after the time point corresponding to the access point 2 in the bitstream A such that no conflict occurs during bitstream switching.

It may be understood that, in this application, at least two bitstreams are designed for a same bit rate in a same tile, to provide more and denser access points during bitstream switching in order to quickly find a target access point to complete bitstream switching.

In some embodiments, to quickly complete bitstream switching, in this application, at least two bitstreams that have same encoding performance are designed for a same tile. The at least two bitstreams include a first bitstream and a second bitstream, and may be embodied as follows Start and end time points corresponding to the first bitstream are the same as start and end time points corresponding to the second bitstream, and a length of a group of pictures GOP corresponding to a first bitstream segment in the first bitstream is different from a GOP length corresponding to a first bitstream segment in the second bitstream. Optionally, a length of an $i^{th}$ bitstream segment in the first bitstream is the same as a length of a $j^{th}$ bitstream segment in the second bitstream, where i is a group of integers greater than 1 or an integer greater than 1. As shown in FIG. 2, assuming that the bitstream has N access points, i may be a group of integers from 2 to N, for example, 2, 3, or 4.

Optionally, a time point corresponding to an SAP in an $L^{th}$ bitstream segment in the first bitstream is different from a time point corresponding to an SAP in an $L^{th}$ bitstream segment in the second bitstream.

Optionally, a GOP length corresponding to a last segment in the first bitstream is also different from a GOP length corresponding to a last bitstream segment in the second bitstream.

For example, in FIG. 2, in the bitstream A to the bitstream M, except that GOP lengths of the first segments 1 and the last segments N are different, GOP lengths of segments with a same number in intermediate segments in different bitstreams may be the same. For example, in the bitstream A to the bitstream M, GOP lengths of segments 2 are the same, GOP lengths of segments 3 may be the same, . . . , and GOP lengths of segments N−1 may be the same.

In some embodiments, the at least two bitstreams that have the same encoding performance may further be represented as follows. The at least two bitstreams include the first bitstream and the second bitstream. An $N^{th}$ access point in the second bitstream is located between an $N^{th}$ access point and an $(N+1)^{th}$ access point in the first bitstream, a time point corresponding to the $N^{th}$ access point in the first bitstream is different from a time point corresponding to the $N^{th}$ access point in the second bitstream, and the time point corresponding to the $N^{th}$ access point of the first bitstream is different from a time point corresponding to an $(N+1)^{th}$ access point of the second bitstream. A time interval (for example, 200 ms) may be set when the $N^{th}$ access point in the second bitstream is located after the $N^{th}$ access point in the first bitstream. N may be a positive integer, an integer greater than 1, an integer greater than 2, an integer greater than 3, or the like. This is not limited in this application. For example, when the first bitstream includes K segments, N may be a group of integers from 3 to K. For details, refer to FIG. 2. For example, the access point 1 corresponding to the end time point of the segment 1 in the bitstream C is located between an access point 1 corresponding to the start time point of the segment 2 in the bitstream A and the access point 2 corresponding to the end time point of the segment 2 in the bitstream A.

Correspondingly, in step S102, the client may obtain the media description information from a server in advance, and store the media description information in a local database. When determining that bitstream switching needs to be performed, the client may obtain the media description information from the server or the local database. Correspondingly, the client may obtain the foregoing information in the media description information by parsing the media description information, for example, information such as the plurality of bit rates corresponding to each of the m tiles and the access point included in each bitstream.

There are the following four corresponding scenarios in which the client determines that bitstream switching needs to be performed.

In a first scenario, in a process in which the client plays a video, switching of bitstreams of different bit rates occurs due to unstable network quality.

In a second scenario, in a process in which the client plays a video, a user actively adjusts a playing progress of the video, and further bitstream switching occurs.

In a third scenario, in a process in which the client plays a video, a user actively changes a channel, and bitstream switching correspondingly occurs. For example, if the user switches from a channel 1 to a channel 2, program content (that is, a bitstream corresponding to a program) is also switched from a program 1 to a program 2.

In a fourth scenario, in a process in which the client plays a video, a viewport range (for example, 360° or 720°) of the video far exceeds an observation range of a normal line of sight of the user. Therefore, an observation viewport of the user changes. Correspondingly, video content (a video picture) viewed by the user also changes with a change of the viewport, and bitstream (video) switching also correspondingly occurs.

Figure 4:
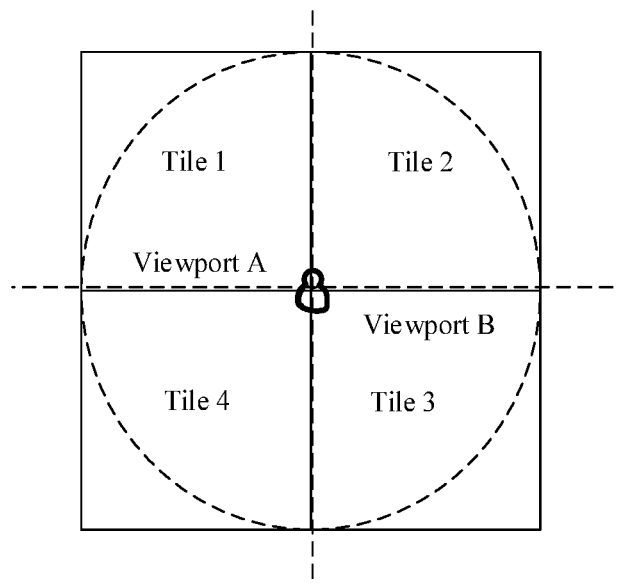
FIG. 4 is a schematic diagram of a viewport scenario according to an embodiment of the present disclosure.

FIG. 4 is a schematic diagram of a scenario in which a viewport changes. An example in which a user views a panoramic (360°) video is used. The panoramic video (or a panoramic picture) includes four tiles: a tile 1 to a tile 4. The user can view video content corresponding to the tile 1 in a viewport A, and view video content corresponding to the tile 3 when switching to a viewport B. Correspondingly, in a process in which the viewport of the user switches, bitstream (video stream) switching may also occur. The four tiles herein and the tile 1 and the tile 3 respectively viewed in the viewport A and the viewport B are merely examples, and do not constitute a limitation. In actual application, a large viewport video may include more tiles, and the user views more than one tile in different fields of view.

Based on the foregoing three scenarios, correspondingly, there are the following several implementations for step S104 and step S106.

In a first implementation, in the scenario in which the network quality is unstable, the user actively adjusts the playing progress, or the user switches the channel, the viewport range viewed by the user does not change. In this application, related content is described using an example in which the first picture area is the first tile and the quality parameter is the bit rate. It may be understood that, when the quality parameter is another parameter, the following principle is also used for implementation.

After S102, the client may obtain a plurality of bit rates corresponding to the first tile after parsing the media description information, and the media description information may include at least two bitstreams respectively corresponding to different bit rates in the first tile. For example, the media description information includes six bitstreams in the first tile. Bitstreams with a high bit rate are a bitstream 1 and a bitstream 2, bitstreams with a medium bit rate are a bitstream 3 and a bitstream 4, and bitstreams with a low bit rate are a bitstream 5 and a bitstream 6.

In S104, the client may determine, from the foregoing three types of bit rates based on current network quality, a target bit rate suitable for the current network quality, and determine, from the media description information, at least two bitstreams corresponding to the target bit rate. Further, the client may determine, from the at least two bitstreams (that is, at least two bitstreams corresponding to a same bit rate in the first tile) corresponding to the target bit rate, the to-be-played first target bitstream. The first target bitstream is any one of the at least two bitstreams. In the foregoing example, assuming that the current network quality is very good (a network speed exceeds 200 megabits per second (Mbits/s)), and the high bit rate is selected as the target bit rate, correspondingly, the first target bitstream may be the bitstream 1 or the bitstream 2.

In some embodiments, to quickly complete bitstream switching, the first target bitstream is a bitstream that corresponds to a target access point and that is in the at least two bitstreams, and the target access point is an access point that is in access points included in the at least two bitstreams and that corresponds to a time point closest to a time point of to-be-played content, where the time point corresponding to the target access point is after the time point of the to-be-played content.

Herein, the time point of the to-be-played content may be a time point corresponding to a change of the network quality, or a time point corresponding to the playing progress adjusted by the user. For example, if a user actively drags a progress bar to an eighth minute when a video A is played to a fifth minute (5:00:00), the time point of the to-be-played content is the eighth minute (8:00:00).

The time point corresponding to the access point includes but is not limited to a time point at which the bitstream is successfully accessed, a decoding time point corresponding to a decoded bitstream after the bitstream is accessed, a number of a frame in which the access point is located in the bitstream, and the like. This is not limited in this application. For the access point, refer to the description in the foregoing embodiment.

To be specific, the client needs to select, from the at least two bitstreams corresponding to the target bit rate, a bitstream in which the target access point closest to the time point of the to-be-played content is located as the first target bitstream. For example, in FIG. 3, a bitstream B to a bitstream M are several bitstreams at a same bit rate (a low bit rate), and start and end time points of a segment in each bitstream may be time points corresponding to an access point of the bitstream. Assuming that network quality deteriorates at a time point T1 in a process in which a user views a bitstream A, the bitstream A needs to be switched to a first target bitstream at the low bit rate. It can be seen from the figure that a time point (T2) corresponding to a target access point in the bitstream B is closest to the time point T1. In this case, a client may select the bitstream B in which the target access point is located as a to-be-played first target bitstream.

In some embodiments, to quickly complete bitstream switching, continuity of bitstream playing needs to be ensured simultaneously, to improve user experience. The first target bitstream may be the bitstream that corresponds to the target access point and that is in the at least two bitstreams, and the target access point is the access point that is in the access points included in the at least two bitstreams and that corresponds to a time point closest to a target time point, where the target time point is after the time point of the to-be-played content. A time point corresponding to a bitstream segment in which the target access point is located is completely downloaded. To be specific, the target time point is a sum of the time point of the to-be-played content and duration for downloading the segment in which the target access point is located. The target access point is after the target time point.

Figure 3:
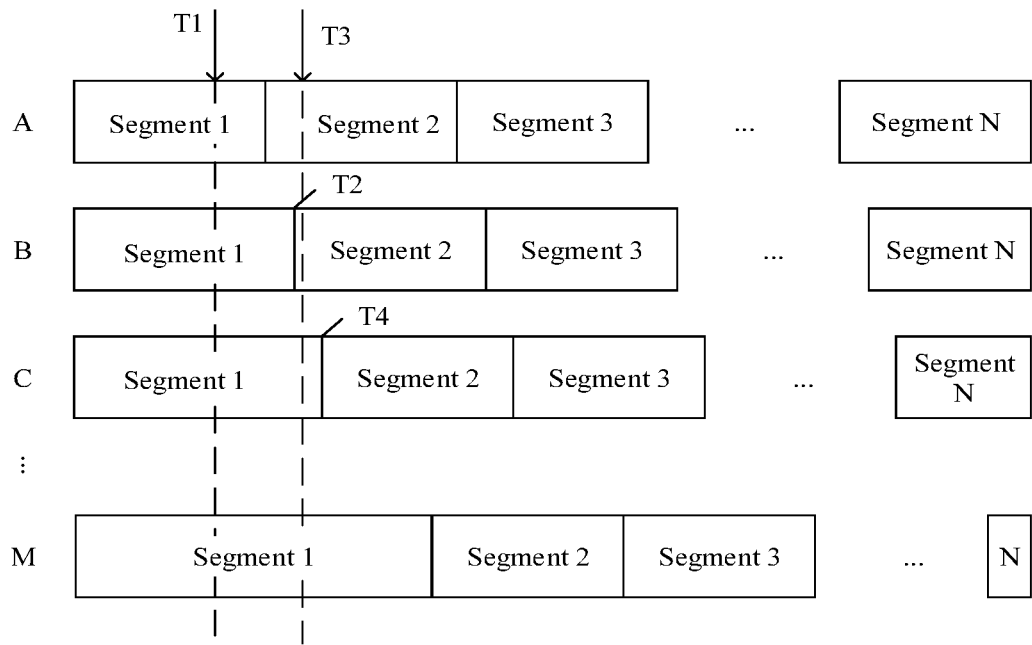
FIG. 3 is a schematic diagram of access points in different bitstreams according to an embodiment of the present disclosure.

To be specific, the client can completely download, within duration between the time point corresponding to the target access point and the time point of the to-be-played content, the segment in which the target access point is located. In this case, the bitstream in which the target access point is located may be used as the to-be-played first target bitstream. For example, referring to the example in FIG. 3, the time point T1 is the time point of the to-be-played content, and a segment in which T1 is located is a segment 1. It is assumed that in a current network situation, duration for downloading the segment 1 is duration corresponding to T1 to T3. When selecting the first target bitstream, the client may use the time point T3 as a reference, search the bitstream B to the bitstream M for the time point corresponding to the target access point, and use a bitstream closest to the time point T3 as the to-be-played first target bitstream. As shown in FIG. 3, an access point corresponding to a time point T4 in the bitstream C is the target access point that meets a requirement. Correspondingly, the client may use the bitstream C as the first target bitstream.

In some possible embodiments, the first target bitstream may be the bitstream that corresponds to the target access point and that is in the at least two bitstreams, and the target access point is the access point that is in the access points included in the at least two bitstreams and that corresponds to the time point closest to the target time point. The target time point is a time point that is after the time point of the to-be-played content and that corresponds to preset duration. The preset duration is a time threshold customized by the user side or the system side. The time point corresponding to the target access point is after the target time point.

Correspondingly, in S106, the client first downloads the first target bitstream from the server, starts to decode the first target bitstream from the target access point in the target bitstream, and plays picture data corresponding to the first target bitstream.

Optionally, to save time, switching of the first target bitstream is completed as soon as possible. In S106, the client may start to download the first target bitstream from a start time point of the bitstream segment in which the target access point is located. Referring to the example in which the first target bitstream is the bitstream B in FIG. 3, the client may start to download the bitstream B (that is, download picture content of a segment 2 to a segment N in the bitstream B) from a segment 2 in which the target access point (T2) is located, and start to decode and play the bitstream B from the time point T2 corresponding to the target access point.

In the foregoing scenario in which the network quality is unstable, and before the to-be-played first target bitstream is determined, the method further includes playing picture data corresponding to a current bitstream corresponding to the first picture area, and determining, based on the media description information, the to-be-played first target bitstream only when the picture data corresponding to the current bitstream that is played needs to be switched to picture data corresponding to a bitstream that corresponds to the first picture area and that has a target quality parameter, where the at least two bitstreams each have the target quality parameter, and a quality parameter of the current bitstream is different from the target quality parameter.

To be specific, a bitstream that meets a target quality parameter corresponding to the current network quality needs to be determined, to determine, from the media description information, the to-be-played first target bitstream.

Correspondingly, in the foregoing scenario in which the user adjusts the playing progress, and before the to-be-played first target bitstream is determined, the method further includes playing picture data corresponding to any one of the at least two bitstreams, and determining, based on the media description information, the to-be-played first target bitstream only when a time point of content currently needs to be played is switched to the time point of the to-be-played content.

Correspondingly, in the foregoing scenario in which the viewport changes, and before the to-be-played first target bitstream is determined, the method further includes playing picture data corresponding to a bitstream corresponding to a third picture area, and determining, based on the media description information, the to-be-played first target bitstream only when the picture data corresponding to the third picture area that is played needs to be switched to picture data corresponding to the first picture area.

In a second implementation, in the scenario in which the viewport changes, the client needs to first determine a changed first viewport, and then find the corresponding target bitstream set from the media description information based on the current network quality and the first viewport, where the target bitstream set includes a target bitstream corresponding to each of at least one tile that can be observed in the first viewport.

The media description information further includes description information of a picture area, that is, a tile that can be observed by the user in an initial viewport. To be specific, the media description information includes the tile in the initial viewport. The initial viewport may be a picture area, that is, a tile, of a large viewport video that can be viewed by the user when the user uses the client to view the large viewport video for the first time.

Correspondingly, after the viewport of the user changes, n tiles that can be observed in the first viewport may be calculated based on the tile in the initial viewport, where n is a positive integer less than or equal to m. The first viewport is a viewport corresponding to the changed viewport of the user, and may be obtained through detection using a sensor element (for example, an angle sensor or a gyroscope) in the client. How to calculate the tile in the first viewport based on the tile in the initial viewport is not described in detail herein. The following describes related content using an example in which a tiles are a first tile and a second tile. When a is a positive integer greater than 2, similarly, a to-be-played target bitstream in each tile may be determined using the following principle.

Then, the client determines, based on the current network quality and from a plurality of bit rates corresponding to different bit rates in the first tile and the second tile, a bit rate suitable for the current network quality. For example, the first tile corresponds to a first bit rate, and the second tile corresponds to a second bit rate. The first bit rate and the second bit rate may be the same or may be different, depending on a definition in the media description information.

Correspondingly, the client may select, from at least two bitstreams corresponding to the first bit rate in the first tile, a target bitstream as the to-be-played first target bitstream, and select, from at least two bitstreams corresponding to the second bit rate in the second tile, a target bitstream as a to-be-played second target bitstream. For details about how to select the to-be-played target bitstream from at least two bitstreams corresponding to a same bit rate, refer to the related description in the foregoing first embodiment. Details are not described herein.

In an optional embodiment, to ensure playing quality of bitstreams corresponding to different tiles in the first viewport of the user, the first target bitstream and the second target bitstream may meet any one or a combination of the following conditions.

(1) Bit rates respectively corresponding to the first target bitstream and the second target bitstream are the same.

It may be understood that the first tile and the second tile form a picture area that can be viewed by the user in the first viewport. To ensure that quality of pictures played in the first viewport is the same, it needs to ensure that bit rates of target bitstreams corresponding to all tiles are the same. In this way, cases such as a case in which picture quality of some tiles is poor (a bit rate of a target bitstream is low) and picture quality of some tiles is good (maven of a target bitstream is high) can be avoided.

(2) Time points respectively corresponding to access points included in the first target bitstream and the second target bitstream are the same.

To be specific, access points included in target bitstreams corresponding to all tiles observed in the first viewport need to overlap in time. In this way, it can be ensured that decoding and playing times of all of the target bitstreams in the first viewport are the same, and the client may perform a unified operation on all the target bitstreams in the first viewport. The operation is sample, and time is saved.

(3) A bitstream segment in which the first target access point is located can be completely downloaded within first duration, and a bitstream segment in which the second target access point is located can be completely downloaded within second duration.

The first duration is duration between a time point corresponding to the first target access point and the time point of the to-be-played content, and the first target access point is an access point that is in the access points included in the first target bitstream and that corresponds to the time point closest to the time point of the to-be-played content, where the time point corresponding to the first target access point is after the time point of the to-be-played content.

The second duration is duration between a time point corresponding to the second target access point and the time point of the to-be-played content, and the second target access point is an access point that is in the access points included in the second target bitstream and that corresponds to the time point closest to the time point of the to-be-played content, where the time point corresponding to the second target access point is after the time point of the to-be-played content.

To be specific, it is required that the target bitstream corresponding to each tile that can be observed in the first viewport can be correspondingly used to download, within duration between the target access point of the target bitstream to a viewport switching time (that is, a time point of the to-be-played content), a segment (segments) in which the target access point is located. For details, refer to the related description in the foregoing first implementation. Details are not described herein. When access points included in the target bitstreams corresponding to all the tiles are aligned in time, it is required that segments in which target access points are located in the target bitstreams corresponding to all of the tiles can be downloaded within same duration.

Correspondingly, in S106, the client first downloads the first target bitstream and the second target bitstream from the server, and starts decoding and playing from the target access points respectively corresponding to the first target bitstream and the second target bitstream.

Optionally, to quickly complete bitstream switching, subsequent segments may be downloaded starting from the segments in which the target access points corresponding to the first target bitstream and the second target bitstream are located. Correspondingly, decoding starts from the target access points corresponding to the first target bitstream and the second target bitstream, and the first target bitstream and the second target bitstream are played. For details, refer to the related description in the foregoing first implementation. Details are not described herein.

The following describes related embodiments of a method for representing an access point included in a bitstream in this application.

In a first embodiment, the media description information may be an MPD file, and the MPD file includes information such as the plurality of bitstreams corresponding to each of the m tiles, a plurality of bitstreams corresponding to a same bit rate, and the access point included in each bitstream. The MPD file includes description information of a bitstream (for example, the first target bitstream), the description information includes indication information, and the indication information is used to indicate information about a time point corresponding to an access point included in the bitstream. The indication information may be used to indicate that a time point corresponding to the access point included in the bitstream overlaps a start time point or an end time point of a bitstream segment. In an example, the MPD file includes the following syntax:

TABLE 1

MPD file

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <!—Omnidirectional video sub-picture (−180~0 degrees) -->
            <AdaptationSet id= "1" segmentAlignment="false" startsWithSAP="1">
                Representation id="180-video-1" mimeType="video/mp4"
codecs="avc1.42c01e" width="1980" height="1980" bandwidth="20000000"
startWithSAP="1">
<EssentialProperty schemeIdUri="urn:mpeg:mpegB:cicp:PF" value="0 "/
<EssentialProperty schemeIdUri="urn:mpeg:omaf:rwpk:2017" value="0"/>
<SuplementalProperty schemeIdUri=" urn:mpeg:omaf:cc:2017" value="-90.0 0.0
180.0 180.0"/>
            <SegmentTemplate timescale="90000" initialization=
"$RepresentationID %/init.mp4v" media=" $RepresentationID%/$Time$.mp4v ">
<SegmentTimeline>
                    <S t="0" d="180000" r="432" />
</SegmentTimeline>
                </SegmentTemplate>
</Representation>
    <Representation id="180-video-2" mimeType="video/mp4"
codecs="avc1.42c01e"      width="1980" height="1980"
bandwidth="20000000" startWithSAP="1">
<EssentialProperty schemeIdUri="urn:mpeg:mpegB:cicp:PF" value="0 "/
<EssentialProperty schemeIdUri="urn:mpeg:omaf:rwpk:2017" value="0"/>
<SuplementalProperty schemeIdUri=" urn:mpeg:omaf:cc:2017" value="-90.0 0.0
180.0 180.0"/>
            <SegmentTemplate timescale="90000" initialization=
"$RepresentationID %/init.mp4v" media=" $RepresentationID %/$Time$.mp4v ">
<SegmentTimeline>
                    <S t="0" d="198000" r="1" />
                    <S t="198000" d="180000" r="431" />
</SegmentTimeline>
                </SegmentTemplate>
</Representation>
</AdaptationSet>
</Period>
</MPD>
```

Syntax elements are as follows:

AdaptationSet id and Representation id indicate a bitstream (id) corresponding to a tile (id). AdaptationSet id indicates the tile id, and Representation id indicates the bitstream id. Table 1 shows two bitstreams in a tile 1 (one tile whose id is equal to 1), and identifier ids of the two bitstreams are respectively 180-video-1 and 180-video-2.

<AdaptationSet>-</AdaptationSet> indicates description information of each bitstream in AdaptationSet id (that is, a tile). <Representation>-</Representation> indicates description information for describing a bitstream, that is, description information of the bitstream.

bandwidth indicates a bandwidth of a bitstream. The bandwidth is positively correlated with a bit rate, and the bandwidth also reflects a bit rate of a bitstream. When bandwidths of two bitstreams are the same, it indicates that bit rates of the two bitstreams are the same. For example, in the foregoing Table 1, both a bandwidth of the bitstream with 180-video-1 and a bandwidth of the bitstream with 180-video-2 are 2000000, it indicates that the two bitstreams with a same bit rate are shown in Table 1.

<SegmentTimeline>-</SegmentTimeline> indicates a bitstream segment included in a bitstream and duration of each segment (or a GOP length of the segment). For example, in the foregoing Table 1, in the bitstream whose id is 180-video-1, a SegmentTimeline attribute indicates that the bitstream with 180-video-1 includes a total of 432 segments, and duration of each segment is d/timescale=180000/90000=2 seconds (s).

Correspondingly, in the bitstream whose id is 180-video-2, a SegmentTimeline attribute indicates that the bitstream with 180-video-1 includes a total of 432 segments. Duration of a first segment is d/timescale=198000/90000=2.2 s, and duration of each of the subsequent 431 segments is d/timescale=180000/90000=2 s.

segmentAlignment indicates whether segments included in a plurality of bitstreams in a tile are aligned in time, to be specific, whether segments with a same identifier (number) in the plurality of bitstreams in the tile overlap in time. When segmentAlignment="false", it indicates that the segments included in the plurality of bitstreams in the tile are not aligned in time. When segmentAlignment="ture", it indicates that the segments included in the plurality of bitstreams in the tile are aligned in time.

startsWithSAP indicates whether each segment included in a bitstream starts from an access point, to be specific, whether a start time point of each segment is the access point. When startsWithSAP="1", it indicates that each segment starts from the access point, to be specific, the start time point of each segment is the access point. When startsWithSA="0", it indicates that each segment does not start from the access point, to be specific, the access point is not the start time point of each segment.

In a second embodiment, the media description information may be an MPD file. The MPD file includes first description information of a bitstream (for example, the first target bitstream), the first description information includes first indication information, and the first indication information is used to indicate information about a time point corresponding to an access point included in the bitstream.

In an optional embodiment, the first indication information may be used to indicate a time point corresponding to a first access point in the bitstream, a time interval between two adjacent access points in the bitstream, and a quantity of access points in the bitstream. To be specific, in the MPD file, the time point corresponding to the first access point (that is, a time point of a start access point) in the bitstream, the time interval between the two adjacent access points, and the quantity of access points (which may be a quantity of access points that meet the time interval) are used such that the information about the time point may include the time point corresponding to the first access point in the bitstream, the time interval between the two adjacent access points in the bitstream, and the quantity of access points in the bitstream.

In some embodiments, the first indication is further used to indicate a quantity of SAP groups. Correspondingly, the information about the time point may include a time point corresponding to a first SAP in the SAP group, a time interval between two adjacent SAPs in the SAP group, and a quantity of SAPs in the SAP group.

In the ISO/IEC 23009-1 standard, also referred to as the DASH (Dynamic Adaptive Streaming over HTTP) standard, first indication information SAPTimeLine is newly added to indicate an access point (for example, an SAP) included in a bitstream. Syntax of the SAPTimeLine is as follows:

TABLE 2

Syntax format of SAPTimeLine

| Element name | Representation field | Description |
| --- | --- | --- |
| SAPTimeLine | | Indicate information about a time point of an access point. |
| S | Positive integer | Indicate start times and an interval time of consecutive access points with a same time interval, that is, indicate information about an access point in an access point group. |
| @t | O (may be a constant) | Indicate a time point of a first (start) access point. @timescale isused as a unit of @t. |
| @i | M (may be a constant) | Indicate a time interval between access points, that is, a time interval between two adjacent access points. @timescale is used as a unit of @i. |
| @r | OD (may be a positive integer) | Quantity of access points that comply with the time interval @i described above. A default value of @r is usually 0. |

In the syntax shown in Table 2, O indicates an optional attribute, M indicates a mandatory attribute, and OD indicates an optional attribute that carries a default value.

Based on the foregoing syntax of SAPTimeLine, in the following example, an MPD file using SAPTimeLine includes the following syntax:

TABLE 3

MPD file

<?xml version="1.0" encoding="UTF-8"?>
<MPD
 xmlns="urn:mpeg:dash:schema:mpd:2011"
 type="static"
 mediaPresentationDuration="PT10S"
 minBufferTime="PT1S"

TABLE 3-continued

MPD file

```
  profiles="urn:mpeg:dash:profile:isoff-on-demand:2011">
  <Period>
    <!—Omnidirectional video sub-picture (-180~0 degrees) ->
        <AdaptationSet id= "1" segmentAlignment="false" startsWithSAP="1">
          <Representation id="180-video-1" mimeType="video/mp4"
codecs="avc1.42c01e" width="1980" height="1980" bandwidth="20000000"
startWithSAP="1">
<EssentialProperty schemeIdUri="urn:mpeg:mpegB:cicp:PF" value="0"/
<EssentialProperty schemeIdUri="urn:mpeg:omaf:rwpk:2017" value="0"/>
<SuplementalProperty schemeIdUri=" urn:mpeg:omaf:cc:2017" value="-90.0 0.0
180.0 180.0"/>
        <SegmentTemplate timescale="90000" initialization=
"$RepresentationID %/init.mp4v" media=" $RepresentationID%/$Time$.mp4v ">
<SegmentTimeline>
                <S t="0" d="180000" r="432" />
</SegmentTimeline>
<SAPTimeline>
                <S t="0" i="90000" r="864" />
</SAPTimeline>
              </SegmentTemplate>
</Representation>
  <Representation id="180-video-2" mimeType="video/mp4"
codecs="avc1.42c01e"     width="180" height="1980"
bandwidth="20000000" startWithSAP="1">
<EssentialProperty schemeIdUri="urn:mpeg:mpegB:cicp:PF" value="0 "/
<EssentialProperty schemeIdUri="urn:mpeg:omaf:rwpk:2017" value="0"/>
<SuplementalProperty schemeIdUri=" urn:mpeg:omaf:cc:2017" value="-90.0 0.0
180.0 180.0"/>
        <SegmentTemplate timescale="90000" initialization=
"$RepresentationID %/init.mp4v" media=" $RepresentationID%/$Time$.mp4v ">
<SegmentTimeline>
                <S t="0" d="198000" r="1" />
                <S t="198000" d="180000" r="431" />
</SegmentTimeline>
<SAPTimeline>
                <S t="0" i="90000" r="2" />
                <S t="198000" i="90000" r="862" />
</SAPTimeline>
              </SegmentTemplate>
</Representation>
</AdaptationSet>
</Period>
</MPD>
```

Syntax elements are as follows:

<SAPTimeline>-</SAPTimeline> indicates information about a time point corresponding to an access point included in a bitstream, that is, the first indication information. For example, in Table 3, in a bitstream whose id is 180-video-1, an SAP Timeline attribute indicates that the bitstream with 180-video-1 includes a total of 864 access points, and a time interval between two adjacent access points is i/timescale=90000/90000=1 s.

Correspondingly, in a bitstream whose id is 180-video-2, an SAP Timeline attribute indicates that the bitstream with 180-video-2 includes a total of 864 access points, a first segment includes two SPAs, a first access point starts from 0 s, and a time interval of access points is 1 s. Subsequent segments in the bitstream include 862 access points. The first access point starts from 2.2 s, and the time interval between the access points is 1 s.

To be specific, the bitstream with 180-video-2 includes two access point groups that are adjacent in time, the first access point group includes two access points, a first access point in the group starts from 0 s, and a time interval between the access points in the group is 1 s. The first access point group includes 862 access points, a first access point in the group starts from 2.2 s, and a time interval between the access points in the group is 1 s. In addition, there is no other access point in an unoccupied time between the first access point group and the second access point group.

In a third embodiment, the media description information may be an MPD file. The MPD file includes description information of bitstreams respectively corresponding to different tiles. Herein, the first target bitstream and the second target bitstream are used as an example. The MPD file includes first description information of the first target bitstream, and the first description information may include the first indication information in the foregoing second embodiment. Details are not described herein. Correspondingly, the MPD file further includes second description information of the second target bitstream, and the second description information includes second indication information. The second indication information is used to indicate that time periods corresponding to bitstream segments respectively included in the first target bitstream and the second target bitstream overlap, that is, is used to indicate that segments included in any two bitstreams are aligned in time. Optionally, the any two bitstreams may be bitstreams in different tiles.

In the ISO/IEC 23009-1 (DASH) standard, segmentTemplate needs to be used to describe a segment status for each Representation of each AdaptationSet. For details, refer to the related descriptions in the foregoing first and second embodiments. In this application, segments and positions that are of access points of bitstreams in different tiles and that exist in at least two bitstreams corresponding to a same bit rate that are prepared for the different tiles are aligned/same. To reduce overheads, a segmentAlignAcrossAdap attribute description is newly added to this application, to indicate that time periods corresponding to segments included in different bitstreams overlap. Syntax of segmentAlignAcrossAdap is as follows:

TABLE 4 segmentAlignAcrossAdap syntax

| Element name | Representation field | Description |
| --- | --- | --- |
| segmentAlignAcrossAdap | | Indicate that time periods corresponding to segments in different bitstreams overlap, to be specific, segments included in different bitstreams are the same. |
| Representation_id | M (a set field, for example, a natural number) | Correspond to aligned representation id. |

In the syntax shown in Table 4, O indicates an optional attribute, M indicates a mandatory attribute, and OD indicates an optional attribute that carries a default value.

In an example, an MPD file using segmentAlignAcrossAdap is as follows:

Syntax elements are as follows:

segmentAlignAcrossAdap="Representation_id", indicating the second target bitstream whose segment setting manner is the same as that of the first target bitstream. For example, in Table 5, in a bitstream whose id is 180-video-2, a segmentAlignAcrossAdap attribute indicates that a segment included in the bitstream with 180-video-2 is correspondingly the same as a segment included in a bitstream with 180-video-1.

In an optional embodiment, segmentAlignAcrossAdap="AdaptationSet id, Representation_id" may be further defined, and is used to indicate the second target bitstream whose segment setting manner is the same as that of the first target bitstream and a tile corresponding to the second target bitstream. For example, in the foregoing Table 5, it is assumed that segmentAlignAcrossAdap="1, 180-video-1", it indicates that in the bitstream whose id is 180-video-2, the segmentAlignAcrossAdap attribute indicates that the segment included in the bitstream with 180-video-2 is correspondingly the same as the segment included in the bitstream with 180-video-1 and AdaptationSet id 1.

It may be further seen from Table 5 that, in the first target bitstream whose AdaptationSet id is 1 and representation id is 180-video-1, information about a segment is described using segmentTemplate and segmentTimeLine. In the second target bitstream whose AdaptationSet id is 2 and representation id is 180-video-2, the segmentAlignAcrossAdap

TABLE 5

MPD file

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <!—Omnidirectional video sub-picture (−180~0 degrees) -->
        <AdaptationSet id= "1" segmentAlignment="false" startsWithSAP="1">
            <Representation id="180-video-1" mimeType="video/mp4"
codecs="avc1.42c01e" width="1980" height="1980" bandwidth="20000000"
startWithSAP="1">
<EssentialProperty schemeIdUri="urn:mpeg:mpegB:cicp:PF" value="0 "/
<EssentialProperty schemeIdUri="urn:mpeg:omaf:rwpk:2017" value="0"/>
<SuplementalProperty schemeIdUri=" urn:mpeg:omaf:cc:2017" value="−90.0 0.0
180.0 180.0"/>
            <SegmentTemplate timescale="90000" initialization=
"$RepresentationID %/init.mp4v" media=" $RepresentationID%/$Time$.mp4v ">
<SegmentTimeline>
                    <S t="0" d="180000" r="432" />
</SegmentTimeline>
<SAPTimeline>
                    <S t="0" i="90000" r="864" />
</SAPTimeline>
            </SegmentTemplate>
</Representation>
</AdaptationSet>
<AdaptationSet id= "2" segmentAlignment="false" startsWithSAP="1">
Representation id="180-video-2" mimeType="video/mp4" codecs="avc1.42c01e"
width="1980" height="1980" bandwidth="20000000" startWithSAP="1">
segmentAlignAcrossAdap= "180-video-1" >
EssentialProperty schemeIdUri="urn:mpeg:mpegB:cicp:PF" value="0"/
EssentialProperty schemeIdUri="urn:mpeg:omaf:rwpk:2017" value="0"/>
<SuplementalProperty schemeIdUri=" urn:mpeg:omaf:cc:2017" value="−90.0 0.0
180.0 180.0"/>
</Representation>
</AdaptationSet>
</Period>
</MPD>
``` attribute is used to indicate that the segment in the second target bitstream is aligned with the segment in the first target bitstream.

It should be noted that, in the third embodiment and the following fourth embodiment, indication information <SAPTimeline>-</SAPTimeline> and <segmentTimeLine>-</segmentTimeLine> included in the MPD file are not all included, but any one or two of the indication information <SAPTimeline>-</SAPTimeline> and <segmentTimeLine>-</segmentTimeLine> may be included. In the third embodiment, <SAPTimeline>-</SAPTimeline> may be optionally included, and correspondingly, in the fourth embodiment, <segmentTimeLine>-</segmentTimeLine> may be selectively included. For example, the foregoing Table 5 includes <SAPTimeline>-</SAPTimeline>, that is, shows information about a time point corresponding to an SAP included in a bitstream.

In a fourth embodiment, similar to the third embodiment, the media description information may be an MPD file. The MPD file includes description information of bitstreams respectively corresponding to different tiles. The first target bitstream and the second target bitstream are used as an example. The MPD file includes first description information of the first target bitstream, and the first description information may include the first indication information in the foregoing second embodiment. Details are not described herein. Correspondingly, the MPD file further includes second description information of the second target bitstream, and the second description information includes third indication information. The third indication information is used to indicate that access points respectively included in the first target bitstream and the second target bitstream correspond to a same time point, that is, is used to indicate that access points included in any two bitstreams are aligned in time. Optionally, the any two bitstreams may be bitstreams in different tiles.

An SAPAlignAcrossAdap attribute description is newly added to this application, to indicate that access points included in different bitstreams correspond to a same time point. Syntax of SAPAlignAcrossAdap is the same as the syntax of segmentAlignAcrossAdap, and may be SAPAlignAcrossAdap="Representation_id" or SAPAlignAcrossAdap="AdaptiveSet_id, Representation_id". For details, refer to the related description of segmentAlignAcrossAdap. Details are not described herein.

In a fifth embodiment, the media description information includes information in a media track in which a bitstream (for example, the first target bitstream) is located. The media description information includes fourth indication information. The media track in which the first target bitstream is located includes first box data. The first box data includes the fourth indication information. The fourth indication information is used to indicate information about a time point corresponding to an access point included in the bitstream (for example, the first target bitstream), and also indicate the time point corresponding to the access point in the bitstream.

In some embodiments, the fourth indication information may be used to indicate a time point corresponding to a first access point in the bitstream, a time interval between two adjacent access points in the bitstream, and a quantity of access points in the bitstream. The information about the time point includes the time point corresponding to the first access point in the bitstream, the time interval between the two adjacent access points in the bitstream, and the quantity of access points in the bitstream.

In some embodiments, the first box data may further include fifth indication information, where the fifth indication information is used to indicate a quantity Num-entry of access point groups, and Num-entry is a positive integer. When Num-entry is greater than or equal to 1, the access point groups include a first access point group and a second access point that are adjacent in time. A time interval between two adjacent access points in the first access point group is the same, a time interval between two adjacent access points in the second access point group is the same, and there is no access point in time periods corresponding to the first access point group and the second access point group. For the access group, refer to the related descriptions in the foregoing embodiment. Details are not described herein.

Correspondingly, the information about the time point includes a time point corresponding to a first SAP in the SAP group, a time interval between two adjacent SAPs in the SAP group, and a quantity of SAPs in the SAP group.

In the ISOBMFF (ISO/IEC 14496-12) standard, a newly added/newly defined box is used to indicate an access point included in a bitstream. A type of the newly added box is not limited, and may be customized by the user side or the system side. Herein, a 'spat' type is used as an example in this application, and one media track includes a maximum of one 'spat' box. Correspondingly, the 'spat' box newly added in this application includes the following syntax:

TABLE 6

'spat' box

```
class SAPTimeLineBox extends FullBox('sapt') {
    unsigned int(32) num_entry;
    for(i=0;i<num_entry;i++) {
        unsigned int(32) start;
        unsigned int(32) interval;
        unsigned int(32) repeat;
    }
}
```

Syntax elements are as follows:

num_entry indicates a quantity of access point groups, that is, a quantity of entries. A segment of consecutive access points with a same time interval is an entry (that is, the access point group). For related description of the access point group, refer to the related description in the foregoing embodiment. Details are not described herein.

Start indicates a start time of a first access point.

Interval indicates a time interval between two adjacent access points.

repeat indicates a repeated quantity of access points starting from @start and with an interval @interval, that is, a quantity of access points that comply with the interval @interval.

In a sixth embodiment, the media description information includes information in a media track in which a bitstream (for example, the second target bitstream) is located. The media description information includes sixth indication information. The media track in which the second target bitstream is located includes second box data, and the second box data includes the sixth indication information. The sixth indication information is used to indicate that a time point corresponding to an SAP included in the first target sub-bitstream is the same as a time point corresponding to an SAP included in the second target bitstream.

In some embodiments, the media track in which the first target bitstream is located further includes third box data, the third box data includes seventh indication information, and a value of the seventh indication information is the same as a value of the sixth indication information.

In some embodiments, the second box data and the third box data are box data of a combination type (TrackGroupTypeBox), and a combination type of the second box data is the same as a combination type of the third box data.

In the ISOBMFF (ISO/IEC 14496-12) standard, a method for representing an access point in a bitstream (track) may be represented using a related principle in the foregoing fourth embodiment. To avoid using a same manner to represent a plurality of bitstreams whose access points are aligned one by one in time, in this application, the bitstreams (track) whose access points are aligned in time may be represented in a manner of a bitstream group track_group. Bit rates corresponding to at least two bitstreams included in the bitstream group may be the same or may be different. This is not limited.

In this application, a combination type box (TrackGroupTypeBox) is further newly added/newly defined, to indicate that access points included in any two bitstreams correspond to a same time point, that is, are aligned in time. Syntax of TrackGroupTypeBox is defined as follows:

TABLE 7

TrackGroupTypeBox aligned(8) class TrackGroupTypeBox(unsigned int(32) track_group_type) extends
             FullBox(track_group_type, version=0, flags = 0) {
unsigned int(32) track_group_id
}

Syntax elements are as follows:

Track_group_type indicates a type of a bitstream combination, that is, a type of a category to which the bitstream belongs.

Track_group_id indicates an identifier of the bitstream combination, that is, an identifier of the category to which the bitstream belongs. Tracks with a same type and a same id belong to a same combination. To be specific, bitstreams that have same Track_group_type and same Track_group_id can form a bitstream category (a bitstream combination).

Based on a definition of TrackGroupTypeBox, a new type of TrackGroupTypeBox is added in this application, and the type may be customized by the user side or the system side. Herein, in this application, a 'sapa' type is used as an example, and one media track includes a maximum of one 'sapa' box. Correspondingly, the 'sapa' box newly added in this application includes the following syntax:

TABLE 8

'sapa' box aligned(8) class SAPAlignmentGroupBox extends
TrackGroupTypeBox('sapa') {
}

It can be seen from the foregoing Table 8 that access points respectively corresponding to bitstreams (tracks) whose type of trackGroupTypeBox is 'sapa' and whose track_group_id is the same are aligned in time. In actual application, a track in which each bitstream is located includes the foregoing 'sapa' box such that it is determined, based on a type of TrackGroupTypeBox and a value of track_group_id in the bitstream, that the access points included in the any two bitstreams are the same.

By implementing the embodiments of the present disclosure, problems such as a relatively long switching delay in a bitstream switching process can be resolved. This improves bitstream switching efficiency.

The foregoing mainly describes the solutions provided in the embodiments of the present disclosure from a perspective of the client. A device corresponding to the client may be a terminal device. It may be understood that to implement the foregoing functions, the terminal device includes corresponding hardware structures and/or software modules for performing the functions. With reference to the units and algorithm steps described in the embodiments disclosed in the present disclosure, the embodiments of the present disclosure can be implemented in a form of hardware or a combination of hardware and computer software. Whether a function is performed by hardware or hardware driven by computer software depends on particular applications and design constraints of the technical solutions. A person skilled in the field may use different methods to implement the described functions for each particular application, but it should not be considered that the implementation falls beyond the scope of the technical solutions in the present disclosure.

In the embodiments of the present disclosure, the device may be divided into functional units based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of the present disclosure, division into the units is an example, is merely logical function division, and there may have other division in actual implementation.

Figure 5:
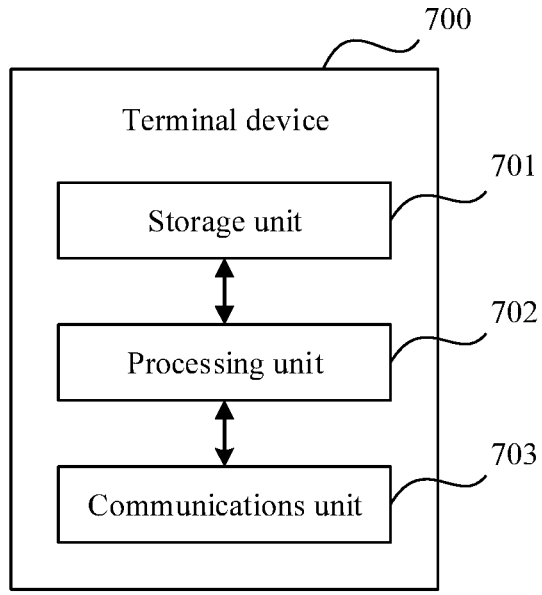
FIG. 5 is a schematic structural diagram of a terminal device according to an embodiment of the present disclosure.

When the integrated unit is used, FIG. 5 is a possible schematic structural diagram of the terminal device (client device) in the foregoing embodiments. The terminal device 700 includes a processing unit 702 and a communications unit 703. The processing unit 702 is configured to control and manage an action of the terminal device 700. The processing unit 702 is configured to support the terminal device 700 in performing steps S104 and S106 in FIG. 1, and/or is configured to perform another step of the technology described in this specification. The communications unit 703 is configured to support communication between the terminal device 700 and another device, for example, support communication with a server to obtain media description information stored in the server, and/or is configured to perform another step of the technology described in this specification.

When the terminal device implements the present disclosure using software, the terminal device 700 may further include a storage unit 701 configured to store program code and data of the terminal device 700. When the terminal device implements the present disclosure using a circuit or a chip, the terminal device may not have the storage unit.

The processing unit 702 may be a processor or a controller, for example, a central processing unit (CPU), a generalpurpose processor, a digital signal processor (DSP), an application-specific integrated circuit (ASIC), a field-programmable gate array (FPGA), or another programmable logic device, a transistor logic device, a hardware component, or any combination thereof. The processing unit 702 may implement or execute various example logical blocks, modules, and circuits described with reference to content disclosed in the present disclosure. The processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a collective term, and may include one or more interfaces, for example, an interface between the terminal device and another device. The storage unit 701 may be a memory.

Figure 6:
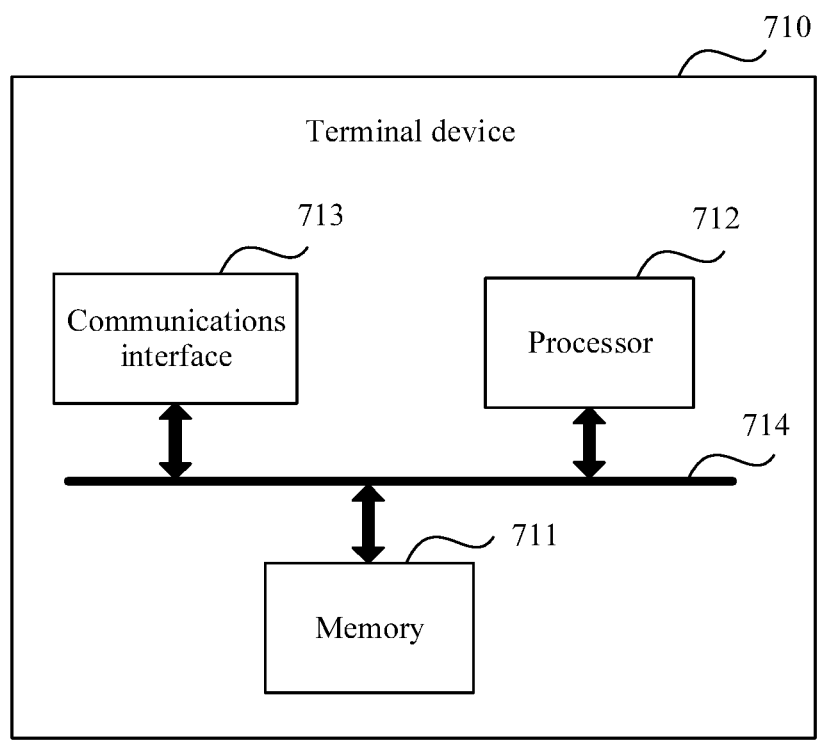
FIG. 6 is a schematic structural diagram of another terminal device according to an embodiment of the present disclosure.

When the processing unit 702 is the processor, the communications unit 703 is the communications interface, and the storage unit 701 is the memory, the terminal device in the embodiments of the present disclosure may be a terminal device shown in FIG. 6.

As shown in FIG. 6, the terminal device 710 includes a processor 712, a communications interface 713, and a memory 77. Optionally, the terminal device 710 may further include a bus 714. The communications interface 713, the processor 712, and the memory 77 may be connected to each other using the bus 714. The bus 714 may be a Peripheral Component Interconnect (PCI) bus, an Extended Industry Standard Architecture (EISA) bus, or the like. The bus 714 may be classified into an address bus, a data bus, a control bus, and the like. For ease of representation, only one thick line is used to represent the bus in FIG. 6, but this does not mean that there is only one bus or only one type of bus.

Optionally, the terminal device shown in FIG. 5 and FIG. 6 may further include a display unit. The display unit may be a display screen, and is not shown in the figures. The display screen is configured to display picture content corresponding to a bitstream.

For specific implementation of the terminal device shown in FIG. 5 or FIG. 6, refer to corresponding description in the foregoing method embodiment. Details are not described herein.

Methods or algorithm steps described in combination with the content disclosed in the embodiments of the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a network device. Certainly, the processor and the storage medium may exist in the terminal device as discrete components.

A person of ordinary skill in the art may understand that all or some of the processes of the method in the embodiment may be implemented by a computer program instructing relevant hardware. The program may be stored in a computer-readable storage medium. When the program is executed, the processes of the method in the embodiment are performed. The foregoing storage medium includes any medium that can store program code, for example, a ROM, a RAM, a magnetic disk, or a compact disc.

What is claimed is:

1. A media information processing method comprising:
obtaining a first group of bitstreams corresponding to a first picture area by separately encoding picture content of the first picture area as a bitstream of the first group, wherein time periods corresponding to the picture content separately encoded by the first group overlap, and wherein a first bitstream of the first group has a first access point different in time from a second access point of a second bitstream of the first group;
obtaining media description information comprising description information of the first group; and
determining, based on the media description information, a first target bitstream,
wherein the first target bitstream corresponds to a first target access point in the first group,
wherein the first target access point is in access points comprised in the first group and corresponds to a target time point closest to a time point of a to-be-played content, and
wherein the target time point is after the time point of the to-be-played content.

2. The media information processing method of claim 1, wherein a first time point corresponding to an $N^{th}$ stream access point (SAP) of the first bitstream is located between a second time point corresponding to an $N^{th}$ SAP of the second bitstream and a third time point corresponding to an $(N+1)^{th}$ SAP of the second bitstream, wherein the first time point is different from the second time point and the third time point, and wherein N is a group of integers greater than 1 or an integer greater than 1.

3. The media information processing method of claim 1, wherein the first group has a same quality parameter comprising at least one of a resolution, a frame rate, a bandwidth, a quality level, or a bit rate.

4. The media information processing method of claim 1, wherein the target time point is either a sum of the time point of the to-be-played content and a duration required for downloading a bitstream segment in which the first target access point is located, or a sum of the time point of the to-be-played content and a preset duration.

5. The media information processing method of claim 1, further comprising playing picture data corresponding to the first target bitstream.

6. The media information processing method of claim 1, wherein the media description information further comprises description information of a second group of bitstreams corresponding to a second picture area, wherein the media information processing method further comprises determining the first target bitstream and a second target bitstream based on the media description information, and wherein the second target bitstream is one of the second two bitstreams.

7. The media information processing method of claim 6, wherein the first target bitstream and the second target bitstream meet at least one of the following conditions:
quality parameters corresponding to the first target bitstream and the second target bitstream are the same;
a first time point corresponding to each of first access points comprised in the first target bitstream is the same as a second time point corresponding to each of second access points comprised in the second target bitstream; or a first bitstream segment in which the first target access point is located is completely downloaded within a first duration, and a second bitstream segment in which a second target access point is located is completely downloaded within a second duration, wherein the first duration is between a third time point corresponding to the first target access point and a fourth time point of the to-be-played content, wherein the first target access point is in the first access points and corresponds to a fifth time point closest to the fourth time point, wherein the third time point is after the fourth time point, wherein the second duration is between a sixth time point corresponding to the second target access point and the fourth time point, wherein the second target access point is in the second access points and corresponds to the fifth time point, and wherein the sixth time point is after the fourth time point.

8. The media information processing method of claim 7, wherein the first group or the second group of bitstreams comprises a third bitstream and a fourth bitstream, wherein a seventh time point corresponding to an $(N+1)^{th}$ access point comprised in the third bitstream is after an eighth time point corresponding to an $N^{th}$ access point comprised in the fourth bitstream, and is before a ninth time point corresponding to an $(N+1)^{th}$ access point comprised in the fourth bitstream, and wherein the third bitstream is either the first target bitstream or the second target bitstream.

9. The media information processing method of claim 1, wherein the media description information comprises a media presentation description (MPD) file.

10. The media information processing method of claim 9, wherein the MPD file comprises first indication information indicating information about a first time point corresponding to an access point comprised in the first target bitstream.

11. The media information processing method of claim 10, wherein the information about the first time point comprises a second time point corresponding to the first access point in the first target bitstream, a time interval between two adjacent access points in the first target bitstream, and a quantity of access points in the first target bitstream.

12. The media information processing method of claim 10, wherein the MPD file further comprises:
first description information of the first target bitstream, wherein the first description information comprises the first indication information; and
second description information of a second target bitstream, wherein the second description information comprises second indication information indicating that the first time point is the same as a second time point corresponding to an access point comprised in the second target bitstream.

13. The media information processing method of claim 10, wherein the MPD file further comprises:
first description information of the first target bitstream, wherein the first description information comprises the first indication information; and
second description information of a second target bitstream, wherein the second description information comprises second indication information indicating that time periods corresponding to bitstream segments comprised in the first target bitstream and the second target bitstream overlap.

14. The media information processing method of claim 1, wherein the media description information comprises information in a first media track in which the first target bitstream is located.

15. The media information processing method of claim 14, wherein the media description information further comprises third indication information, wherein the first media track comprises first box data, wherein the first box data comprises the third indication information, and wherein the third indication information indicates information about a first time point corresponding to an access point comprised in the first target bitstream.

16. The media information processing method of claim 15, wherein the information about the first time point comprises a second time point corresponding to the first access point in the first target bitstream, a time interval between two adjacent access points in the first target bitstream, and a quantity of access points in the first target bitstream.

17. The media information processing method of claim 16, wherein the first box data further comprises fourth indication information indicating a quantity of access point groups, and wherein the information about the first time point further comprises a third time point corresponding to a first stream access point (SAP) in the first target bitstream, a time interval between two adjacent access points in the first bitstream, and a quantity of access points in the first bitstream.

18. The media information processing method of claim 14, wherein the media description information comprises fifth indication information in a second media track in which a second target bitstream is located, wherein the second media track comprises second box data comprising the fifth indication information, and wherein the fifth indication information indicates that a first time point corresponding to an access point comprised in the first target bitstream is the same as a second time point corresponding to an access point comprised in the second target bitstream.

19. The media information processing method of claim 18, wherein the first media track further comprises third box data comprising sixth indication information, and wherein a value of the sixth indication information is the same as a value of the fifth indication information.

20. The media information processing method of claim 19, wherein the second box data and the third box data are of a combination type (TrackGroupTypeBox), and wherein a combination type of the second box data is the same as a combination type of the third box data.

21. A terminal device comprising:
a memory configured to store instructions; and
a processor coupled to the memory, wherein the instructions cause the processor to be configured to:
obtain a first group of bitstreams corresponding to a first picture area by separately encoding picture content of the first picture area as a bitstream of the first group, wherein time periods corresponding to the picture content separately encoded by the first group overlap, and wherein a first bitstream of the first group has a first access point different in time from a second access point of a second bitstream of the first group;
obtain media description information comprising description information of the first group; and determine, based on the media description information, a target bitstream, wherein the target bitstream corresponds to a first target access point is one of in the first group, wherein the first target access point is in access points comprised in the first group and corresponds to a target time point closest to a time point of a to-be-played content, and wherein the target time point is after the time point of the to-be-played content.

22. The terminal device of claim 21, further comprising a receiver coupled to the processor and configured to receive the media description information.

23. The terminal device of claim 21, further comprising a display coupled to the processor and configured to display, under control of the processor, picture data corresponding to the target bitstream.

24. A computer program product comprising computer-executable instructions for storage on a non-transitory computer-readable storage medium that, when executed by a processor cause an apparatus to:

obtain a first group of bitstreams corresponding to a first picture area by separately encoding picture content of the first picture area as a bitstream of the first group, wherein time periods corresponding to the picture content separately encoded by the first group overlap, and wherein a first bitstream of the first group has a first access point different in time from a second access point of a second bitstream of the first group;

obtain media description information comprising description information of the first group; and determine, based on the media description information, a target bitstream, wherein the target bitstream corresponds to a first target access point in the first group, wherein the first target access point is in access points comprised in the first group and corresponds to a target time point closest to a time point of a to-be-played content, and wherein the target time point is after the time point of the to-be-played content.

* * * * *